(12) United States Patent
Agarwal et al.

(10) Patent No.: US 12,112,548 B1
(45) Date of Patent: Oct. 8, 2024

(54) DETECTION OF CAMERA WITH IMPAIRED VIEW

(71) Applicant: Samsara Inc., San Francisco, CA (US)

(72) Inventors: Shaurye Agarwal, Evanston, IL (US); Akshay Raj Dhamija, Campbell, CA (US); Howard Yu, San Francisco, CA (US); Margaret Irene Finch, Austin, TX (US); Jing Wang, Toronto (CA); Rohit Annigeri, Santa Clara, CA (US); Sharan Srinivasan, Sunnyvale, CA (US); Yan Wang, Mercer Island, WA (US); Nathan Hurst, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/618,182

(22) Filed: Mar. 27, 2024

(51) Int. Cl.
*G06V 20/56* (2022.01)
*G06T 3/60* (2024.01)
*G06V 10/44* (2022.01)
*G06V 10/764* (2022.01)

(52) U.S. Cl.
CPC ............... *G06V 20/56* (2022.01); *G06T 3/60* (2013.01); *G06V 10/44* (2022.01); *G06V 10/764* (2022.01)

(58) Field of Classification Search
None
See application file for complete search history.

(56) References Cited

U.S. PATENT DOCUMENTS

| 2023/0134125 | A1* | 5/2023 | Baltaxe | B60W 60/001 701/23 |
| 2024/0029444 | A1* | 1/2024 | Scharfenberger | G06V 20/56 |

* cited by examiner

*Primary Examiner* — Rebecca A Volentine
(74) *Attorney, Agent, or Firm* — Schwegman Lundberg & Woessner, P.A.

(57) ABSTRACT

Methods, systems, and programs are presented for detecting impaired views in monitoring cameras. One method includes training a rotation classifier with unsupervised learning utilizing a first set of images. The rotation classifier is configured to receive an input image and generate a rotation feature embedding for the input image. In addition, the method includes training an impairment classifier with supervised learning utilizing a second set of images, impairment labels for each of the second set of images, and the rotation feature embedding, generated by the rotation classifier, for each of the second set of images. The method further includes accessing a vehicle image captured by a camera on a vehicle, and providing the vehicle image to the impairment classifier as input, and the impairment classifier outputs a camera impairment from a set of camera impairment categories. Further, the vehicle image and the camera impairment are presented on a user interface.

20 Claims, 16 Drawing Sheets

FIG. 12

| Devices | | | | | | | |
|---|---|---|---|---|---|---|---|
| Image | Health Status | Vehicle name | Uptime last 50 hr | Last Location | Camera last ct. | Last ct. | Recommended action |
| | Camera misaligned | 36-19 Joe Doe | | Site 1<br>33 min ago | Mar 19, 2024<br>8:26 AM | Mar 19, 2024<br>8:26 AM | Misaligned camera detected |
| | Camera misaligned | 36-978 | | I39/Rt15 interchange<br>ten seconds ago | Mar 19, 2024<br>5:22 AM | Mar 19, 2024<br>5:22 AM | Misaligned camera detected |
| | Camera misaligned | 36-19 Jane Art | | Jim Arthur sop<br>seconds ago | Mar 19, 2024<br>6:22 AM | Mar 19, 2024<br>6:22 AM | Misaligned camera detected |
| | Needs attention | 36-2512 | | Jim Arthur sop<br>5 min ago | Mar 1, 2024<br>5:50 AM | Mar 1, 2024<br>5:50 AM | Recording issues detected |

DETECTION OF CAMERA WITH IMPAIRED VIEW

TECHNICAL FIELD

The subject matter disclosed herein generally relates to methods, systems, and machine-readable storage media for detecting impaired views in cameras used for monitoring the environment.

BACKGROUND

Fleet managers rely on the analysis of images from inside and outside vehicles to determine events that affect the safe driving of the vehicle, such as improper driver behavior, accident investigation, speeding, tailgating, hazardous conditions, etc. Further, if a driver gets in an accident, a camera with an impaired view will provide useless footage for the purpose of driver exoneration. When the cameras do not provide good images (e.g., the camera view is blocked or the camera viewing angle is not the expected one), then it is not possible to perform an image analysis of the state of the vehicle.

When problems in the analysis arise, it is often difficult to determine if the problem is related to the ability of the camera to take good images or if the problem is something else, such as communication problems. It would be very beneficial to determine when cameras are not working properly in order to remedy the situation before serious problems arise.

BRIEF DESCRIPTION OF THE DRAWINGS

Various appended drawings illustrate examples of the present disclosure and cannot be considered limiting its scope.

FIG. 12 is a user interface (UI) for reviewing camera-impairment events, according to some examples.

DETAILED DESCRIPTION

Example methods, systems, and computer programs are directed at detecting impaired views in cameras used for monitoring the environment (e.g., obstructed view or misaligned viewing angle). Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

A behavioral monitoring system (BMS) is presented for detecting obstruction of dash cameras used in vehicles, and methods are used for training machine learning models to classify cameras based on different types of camera impairments (e.g., obstruction or rotated view). Techniques are presented for addressing the challenge of working with limited label data for training machine learning models and improving precision, especially for nighttime images. The system leverages self-supervision, efficient ensembling techniques, and environmental hints to optimize the accuracy of the assessments. According to certain examples, efficient ensembling techniques involve combining predictions from multiple models to improve accuracy, and environmental hints are contextual clues from a camera's surroundings, like lighting, weather, and location, used to enhance image analysis algorithms for more accurate interpretations.

In one aspect, a method includes training a rotation classifier with unsupervised learning utilizing a first set of images. The rotation classifier is configured to receive an input image and generate a rotation feature embedding for the input image. According to certain examples, a rotation feature embedding is a numerical representation derived from an image that captures the orientation or angle of rotation of the object or scene within the image, facilitating the identification and classification of images based on their rotational characteristics. In addition, the method includes training an impairment classifier with supervised learning utilizing a second set of images, impairment labels for each image of the second set of images, and the rotation feature embedding (generated by the rotation classifier) for each of the second set of images. According to certain examples, an impairment label is a categorization tag assigned to an image indicating the type and degree of visual obstruction or misalignment affecting the camera's view. The method further includes accessing a vehicle image captured by a camera on a vehicle, and providing the vehicle image to the impairment classifier as input, and the impairment classifier outputs a camera impairment from a set of camera impairment categories. Further, the vehicle image and the camera impairment are presented on a user interface.

Figure 1:
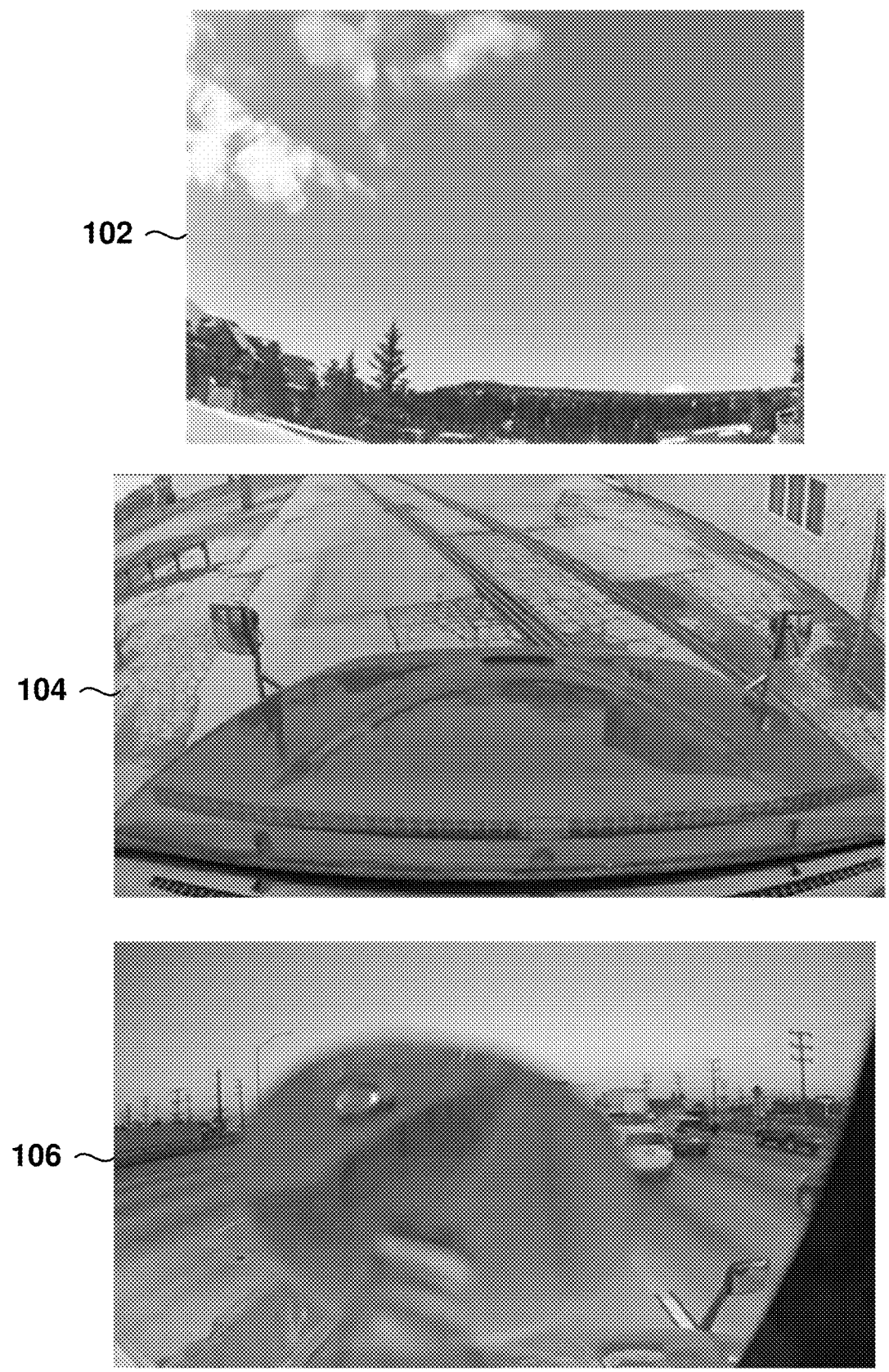
FIG. 1 shows examples of images from cameras with impaired views, according to some examples.

FIG. 1 shows examples of images from cameras with impaired views, according to some examples. In some examples, a network gateway device (NGD) is installed in a vehicle, and the network gateway device includes two cameras: an inward camera that captures inward videos covering the inside of the cabin and an outward camera that captures outward videos covering the road ahead of the vehicle. Some of the examples described herein are for an NGD installed near the windshield and for view impediments of the outward camera. Still, the same principles may be utilized for cameras installed in other parts of the vehicle (e.g., roof, front bender, side mirror) and for inward cameras to identify when images of the driver cannot be accurately obtained.

There are many ways in which the view of a camera may be impaired, such as a misaligned camera pointing to the sky instead of the road ahead (image 102), a misaligned camera pointing too low where only a part of the road ahead is visible and the horizon is not visible (image 104), an obstruction in front of the camera (image 106) (referred to herein as an obstructed camera), reflections from the outside, reflections from the inside (e.g., inside cabin light is on, objects placed on the dashboard), the camera is rotated causing the horizon to appear as a vertical line, dirt on the camera, difficult driving conditions (e.g., snow, heavy rain), camera mount is loose, malfunctioning camera, etc.

The techniques presented provide solutions for the automatic detection of impaired cameras. In particular, the examples are presented with reference to cameras used for monitoring a fleet of drives, but the same principles may be used for any type of monitoring camera.

Typically, small obstructions or misalignments may not disrupt the proper operation of functions that rely on camera images. For example, a camera rotation of 10° to 20° may not affect the vision-recognition models. However, larger deviations will cause the functions to perform improperly and have an impaired camera.

As used herein, an impaired camera is a camera that is unable to provide clear and accurate images required for vehicle behavioral monitoring.

Figure 2:
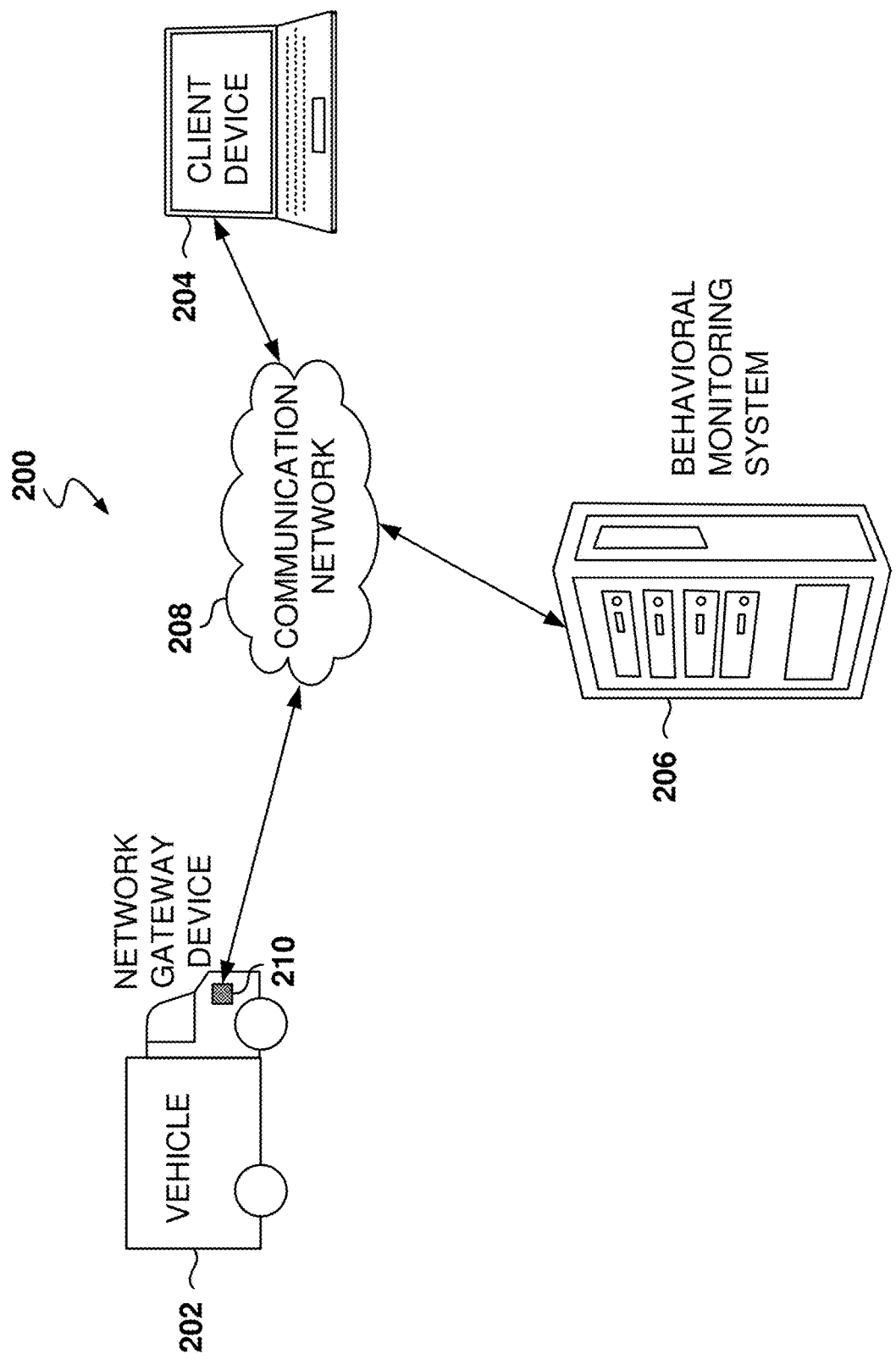
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. As shown, the vehicle 202 includes a network gateway device 210 (NGD) (e.g., vehicle gateway) that allows for remote communication between the vehicle 202 and one or more remote computing devices via the communication network 208.

The NGD 210 is a hardware device that acts as a gate to a network and enables traffic to flow in and out of the network to other networks. For example, the network gateway device 210 can be established as an edge device of a network or system of nodes within the vehicle 202 (e.g., vehicle networking system). For example, the network or system of nodes may include a variety of sensors, computing devices (e.g., electronic control units (ECUs), actuators, etc., deployed within the vehicle. The network gateway device 210 facilitates wireless communication capabilities by connecting to wireless networks (e.g., cellular, wireless local area network, satellite communication networks, etc.) for purposes of communicating with remote computing devices. The network gateway device 210 may also provide additional functionality, such as firewall functionality to filter inbound and outbound communications, disallow incoming communications from suspicious or unauthorized sources, etc.

The use of the NGD 210 allows for a remote computing device to transmit data and commands to the vehicle 202. Similarly, the network gateway device 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The Behavioral Monitoring System 206 is a computing system consisting of one or more computing devices configured to provide remote behavioral monitoring of the vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior, dangerous conditions, or malfunctioning equipment.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

A user may interact with the behavioral monitoring system 206 via a client-side application installed on the client device 204. In some embodiments, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define physical motions and motion thresholds that, if performed, indicate violent, dangerous, and otherwise undesirable movements.

Each triggering condition may also be associated with a corresponding set of response actions to be performed by the behavioral monitoring system 206 if the triggering condition has been satisfied. For example, the response actions may include notifying the fleet administrator that a camera is impaired, notifying the driver of a dangerous condition (e.g., drowsy driving), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications, and the contents of the notifications are to be sent responsive to one or more triggering conditions. Similarly, the user interface enables the administrator to define actions for generating an incident report based on the detected occurrence of undesirable behavior. For example, the user interface enables the administrator to define a modified mode of operation of the sensors in the vehicle 202 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, rotating images captured by the cameras, and modifying the positioning of the sensors, such as by changing the angle or view of a camera to capture better the detected undesirable action.

Figure 3:
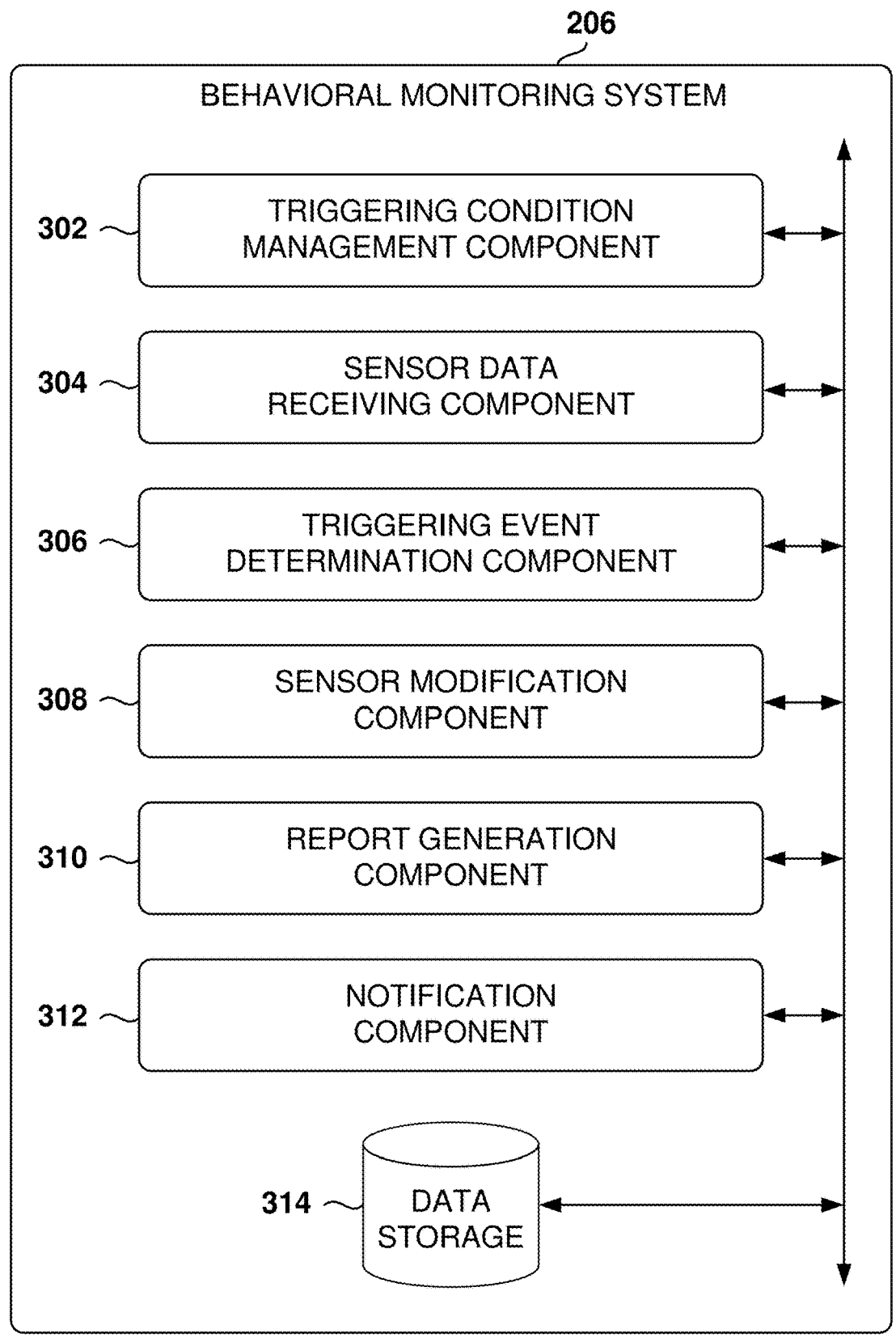
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicate the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, but not limited to, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the network gateway device 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on any one or a combination of individual conditions, such as a combination of detecting specified terms, detecting specified motions, or detecting a specified volume level. In these types of embodiments, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 causes a modification to an operating mode of sensors in the vehicle 202, such as rotating images or relabeling the inside camera and the outside camera if the cameras are angled in the opposite direction than expected. In some cases, an administrator or fleet manager may wish to capture additional or higher-quality sensor data to document a detected incident of undesirable behavior. For example, the administrator or fleet manager may wish to initiate the use of sensors, such as cameras, microphones, and the like, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the time of the incident, the action that satisfied the triggering condition (e.g., detected terms, action, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. The contact identifier may be defined by an administrator when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
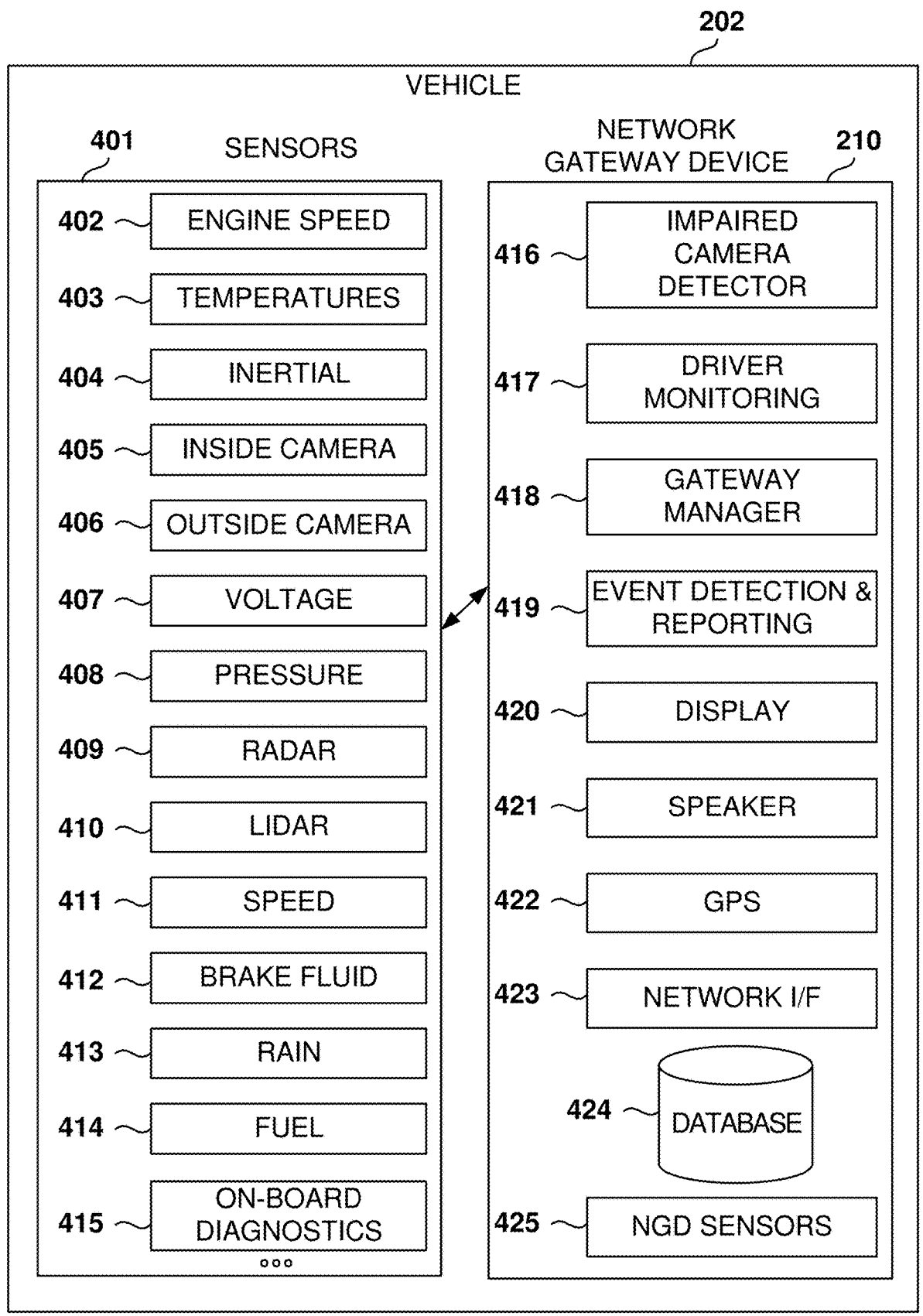
FIG. 4 illustrates the components of a vehicle for rider behavioral monitoring, according to some examples.

FIG. 4 illustrates components of a vehicle 202 for rider behavioral monitoring, according to some examples. The vehicle system includes the NGD 210 and a plurality of sensors 401.

The sensors 401 are configured to monitor various parameters and states of the vehicle. In some examples, the sensors 401 include an engine speed sensor 402 that measures the revolutions per minute of the engine, temperature sensors 403 that measure various temperature points in the vehicle (e.g., cabin, engine, outside), and inertial sensors 404 that detect motion and orientation of the vehicle.

The inside camera 405 is installed within the vehicle cabin to monitor the driver and passengers, while the outside camera 406 provides visual information about the environment surrounding the vehicle. A voltage sensor 407 monitors the electrical system of the vehicle, and pressure sensors 408 detect the pressure in various systems such as tires or hydraulic systems. Radar sensors 409 and Light Detection and Ranging (LIDAR) sensors 410 provide distance and mapping capabilities for the vehicle's surroundings. A speed sensor 411 measures the traveling speed of the vehicle, and a brake fluid sensor 412 monitors the level and condition of the brake fluid. Rain sensors 413 detect precipitation on the vehicle, and fuel sensors 414 monitor the amount of fuel in the tank. The vehicle also includes an on-board diagnostics system 415 for self-diagnosis and reporting of the operational status of the vehicle 202.

The network gateway device 210 (NGD) is configured to communicate with the sensors 401 and includes several components. An impaired camera detector 416 analyzes data to determine if the camera in the vehicle is impaired. A driver monitoring system 417 continuously assesses the state of the driver and the behavior of the driver for a plurality of conditions. The gateway manager 418 oversees the communication between the sensors 401 of the vehicle and the NGD. An event detection and reporting system 419 is configured to identify and log significant events based on sensor data. A display 420 provides visual feedback and information to the vehicle occupants, while a speaker 421 provides auditory information or alerts. A GPS module 422 offers navigation and location-tracking capabilities. A network interface 423 facilitates communication with external networks, and a database 424 stores data collected from the sensors 401 of the vehicle and subsystems for analysis and record-keeping.

Further, the NGD may include NGD sensors 425, such as any of the sensors 401. In some examples, the NGD sensors 425 include an inside camera, an outside camera, and a microphone, but other examples may include additional sensors.

Figure 5:
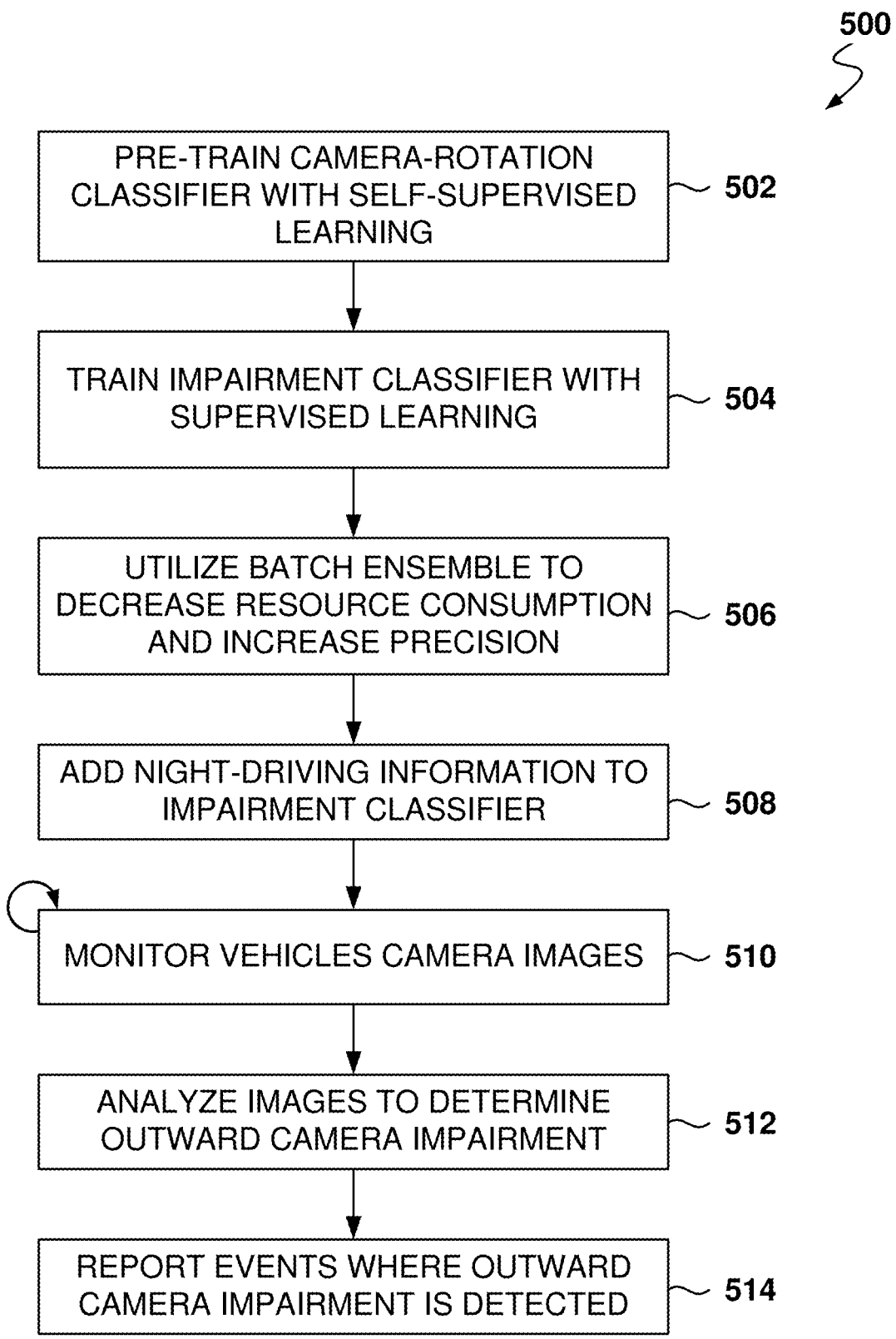
FIG. 5 is a flowchart of a method for detecting cameras with impaired views, according to some examples.

FIG. 5 is a flowchart of a method for detecting cameras with impaired views, according to some examples. While the various operations in this flowchart are presented and described sequentially, one of ordinary skill will appreciate that some or all of the operations may be executed in a different order, be combined or omitted, or be executed in parallel.

Operation 502 is for pre-training a camera-rotation classifier using self-supervised learning. The camera-rotation classifier is a machine-learning (ML) model for classified images according to the rotation of the image on the type of camera that captures the image (e.g., inward camera or outward camera). More details about the camera-rotation classifier are provided below with reference to FIG. 6.

From operation 502, the method 500 flows to operation 504 for training an impairment classifier with supervised learning. The impairment classifier is an ML model trained to determine the type of impairment affecting the camera. More details about the impairment classifier are provided below with reference to, at least, FIGS. 6 and 7.

From operation 504, the method 500 flows to operation 506 for employing a batch-ensemble technique to reduce resource consumption and increase the precision and recall of the impairment classifier. More details about the box and sample are provided below with reference to FIG. 9.

From operation 506, the method 500 flows to operation 508 for adding night-driving information to the impairment classifier, allowing the impairment classifier to adapt to different lighting conditions.

From operation 508, the method 500 flows to operation 510, where the BMS continuously monitors the images captured by the vehicles' cameras.

From operation 510, the method 500 flows to operation 512 for analyzing the camera images to determine outward camera impairment. The BMS analyzes the images and determines if the images are captured correctly or if there is camera impairment.

When an impairment is detected, such as obstructions or misalignment, the BMS, at operation 514, reports the events where the outward-camera-impairment was detected, and a User Interface (UI) is provided for checking the incidents. An example of UI is presented below, in reference to FIG. 12.

The method 500 enables further analysis, maintenance, and improvement of the camera system's performance over time.

Figure 6:
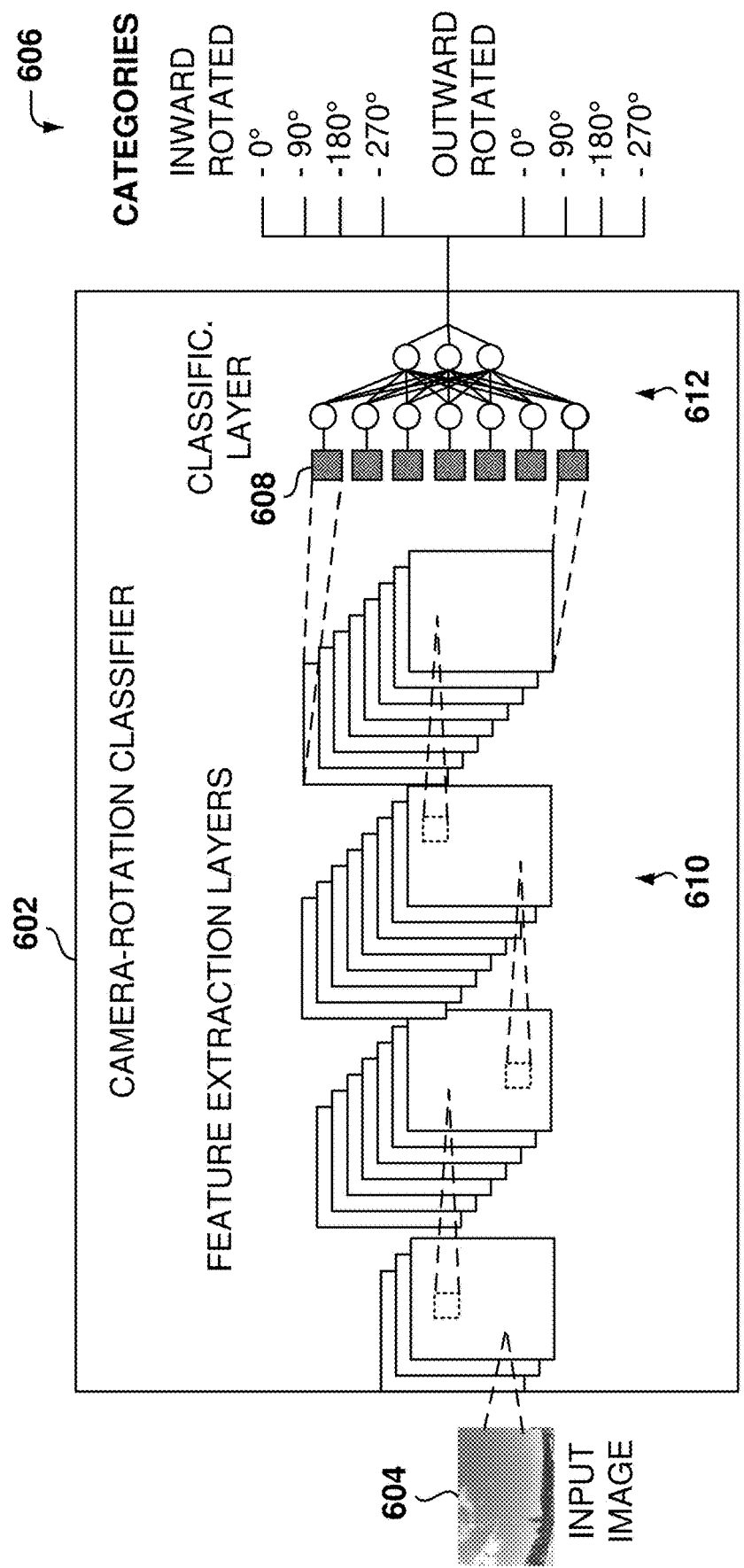
FIG. 6 illustrates the architecture of a camera-rotation classifier according to some examples.

FIG. 6 illustrates the architecture of a camera-rotation classifier according to some examples. One challenge for detecting camera impairment is the ability to work with a limited amount of labeled data, as the process of labeling images tends to be expensive when using human judges to categorize each image. Further, vehicles can be of many different types and work in different types of environments. For example, for a vehicle working in a construction zone, the images will often be blocked by dust flying around. Although this might seem like a camera impairment, the camera is not really impaired, but it is working in a challenging environment.

Several techniques are used to improve the accuracy of the method for determining camera impairment, including self-supervision training, ensembling techniques, and considering day or night operation.

Before training the impairment classifier, a camera-rotation classifier is trained with self-supervised learning, which is referred to herein as pre-training. In some examples, the pre-training is performed with a large number of images (e.g., 450 million images) taken by vehicles, including the inward images and the outward images taken by NGDs.

The goal of the pre-training is to classify the training data into clusters. The images will be of the inside of the cabin or the road ahead and may be misaligned to a certain degree. The clusters are created according to the type of camera (inward or outward) and the rotation of the viewing angle. A rotation of 0° is considered the proper alignment for the camera.

Self-supervised learning is a paradigm in machine learning where a model learns representations or features from the input data without explicit supervision. In the context of a classifier, self-supervised learning involves training the classifier on a pretext task that is constructed from the input data itself rather than relying on manually annotated labels.

The camera-rotation classifier 602 includes feature-extraction layers 610 and a classification layer 612. Given an input image 604, the feature-extraction layers 610 generate a feature vector 608, and the classification layer 612 receives the feature vector 608 and generates the category 606 for the input image 604. In some examples, the category 606 is represented in a rotation feature embedding.

According to certain examples, an embedding is a transformation of raw data into a lower-dimensional space that captures the significant characteristics of the original data in a form that is more manageable for analysis and processing. For example, in the context of machine learning, embeddings are used to convert complex and high-dimensional data, such as images, text, audio, video, speech, configuration data, user data, parameter values, etc., into a dense vector of real or integer numbers. This vector representation allows different types of data to be embedded in a common space where their relationships can be examined and utilized by algorithms, such as by identifying items that are similar when their embeddings are proximate to each other in the multi-dimensional space.

For example, in some examples, the embedding comprises a vector that represents key features (e.g., image features) extracted from an image, such as the orientation or rotation of the image. These embeddings enable the system to compare and analyze images efficiently despite the high dimensionality of the original pixel data. Embeddings are particularly valuable because they can reduce the computational complexity of machine learning models, improve performance by focusing on relevant features, and facilitate operations such as similarity comparisons, clustering, and classification.

The categories 606 include values associated with the type of camera (inward or outward) and the angle of rotation of the camera. In some examples, the categories include eight values: inward rotated 0°, inward rotated 90°, inward rotated 180°, inward rotated 270°, outward rotated 0°, outward rotated 90°, outward rotated 180°, and outward rotated 270°.

Other examples may use a different number of categories. For example, rotation may be divided into values of 45°, which would mean 16 different values. Other examples may select a different number of categories, such as lists in the range of four to 32 values or more.

In some examples, the camera-rotation classifier 602 is implemented as a RotNet classifier, but other types of classifiers may also be used. The RotNet classifier is a type of neural network architecture used for rotational-invariant image classification tasks. Rotational invariance refers to the property of an object or pattern where its appearance remains the same under rotation. In RotNet, the network is trained to recognize objects regardless of their orientation. It does so by training the network to predict the angle of rotation needed to align the object correctly before classifying it. This involves augmenting the training data by rotating images by various angles and training the network to predict the amount of rotation applied. The architecture might vary, but some examples include convolutional neural network (CNN) layers (e.g., the feature extraction layers 610) for feature extraction followed by fully connected layers for classification (e.g., the classification layer 612), with specific adaptations to handle rotational invariance.

In some examples, the basic RotNet classifier was modified to be able to categorize based on the type of camera: inward (driver facing) or outward (environment facing). Instructions are included, so if there are two different kinds of images, then predict whether they are inward or outward.

Figure 7:
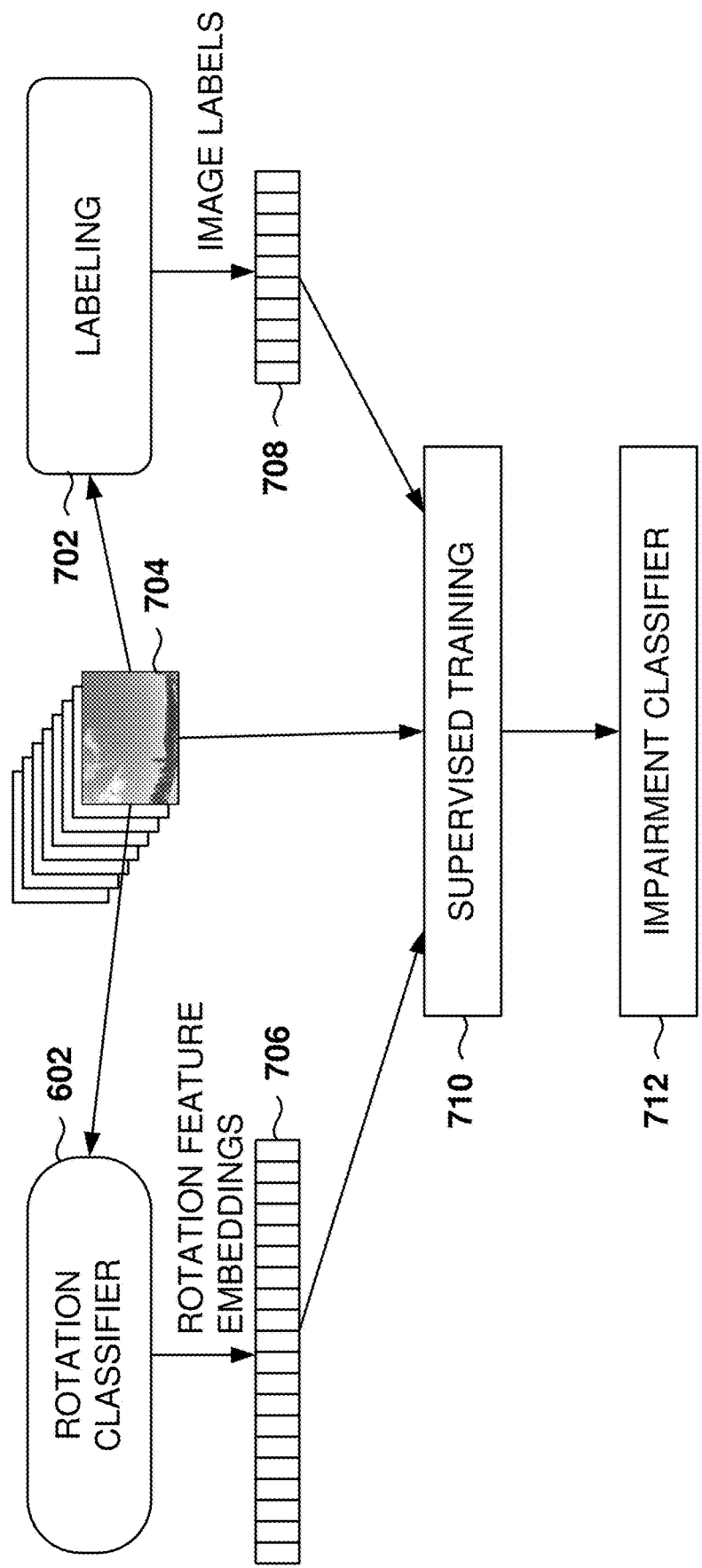
FIG. 7 illustrates the supervised learning process for the impairment classifier according to some examples.

FIG. 7 illustrates the supervised learning process for the impairment classifier according to some examples. During the supervised training of the impairment classifier 712, a set of images 704 is used, and this set of images 704 is much smaller (e.g., 33K) than the set used for pretraining. The impairment classifier 712 will determine the categories associated with the camera impairment.

The images 704 are labeled at operation 702, and the result is a set of image labels 708 corresponding to the images 704. Further, the images 704 are input to the rotation classifier 602, which generates a rotation feature embedding 706 for each image 704.

The obstruction classifier is trained at operation 710 with supervised learning utilizing the images 704, the image labels 708, and the rotation feature embedding 706 as training data. The result of the training is the impairment classifier 712.

During labeling, labelers determine if the camera view is impaired and if the image is for day or night, e.g., is daylight visible in the image. For each image, the following categories were used: normal, hard obstruction (blocked) 25-50%, hard obstruction (blocked) 50-75%, hard obstruction (blocked) 75-100%, misalignment titled up, misalignment tilted down, misalignment upside down, misalignment rotated, misalignment reversed, smudges/blur, external vehicle artifacts, not attached to vehicle, normal with snow/fog, and normal inside building/tunnel/bridges/parking lot/walls. In some examples, for hard obstructions, an obstruction color label was added to select from black/gray, white, red/orange, green, blue/purple, yellow, pink, or brown. Further, an image may have multiple impairments, such as hard obstruction and misalignment.

The label "Normal" is assigned to images that are free from any impairments (e.g., no obstruction, no rotation, no inward camera labeled as an outward camera). The image has a clear view of the road and the vanishing point (e.g., the point where the road and the horizon line meet) in front of the vehicle. Hard obstruction (25%, 50%, 75%) is selected when an opaque object is blocking the camera's view of the road ahead by more than 25%. For obstruction color, the most prominent color of the obstruction is selected. When an image shows the vehicle dashboard, the option selected is misaligned-tilted down. When the camera is blocked by a large external artifact permanently attached to the vehicle, the label selected is external vehicle artifacts.

Misalignment is selected if the road or the vanishing point is not visible or if the view is rotated due to camera placement/position, causing the camera not to capture the road in front. Further, tilted up is when the camera is pointed at the sky or the vehicle's interior roof instead of the road ahead, and tilted down when the camera is pointed at too much of the vehicle hood instead of the road ahead. Further, upside down is for a camera flipped vertically, rotated is for a camera showing a rotation, and reversed is when the camera is pointing at the driver or cabin instead of the road ahead.

Smudge is selected if smudges blur the visibility of the camera, making it appear out of focus. Normal with snow/fog is selected if the camera is not impaired and the road has snow or the visibility of the road is poor due to fog. Normal inside buildings/tunnels/bridges/parking lots/walls is selected if the camera is not obstructed/misaligned and the vehicle is in an enclosed space. Examples of such enclosed spaces include inside garages or buildings, driving inside tunnels, inside parking spaces, facing walls, and driving on a bridge.

In some examples, a smaller set of impairment categories is used, which includes day normal, night normal, misaligned, center artifact, partial obstruction, smudged, hard obstruction, and weather. Other examples may use different types of impairment categories.

Figure 8:
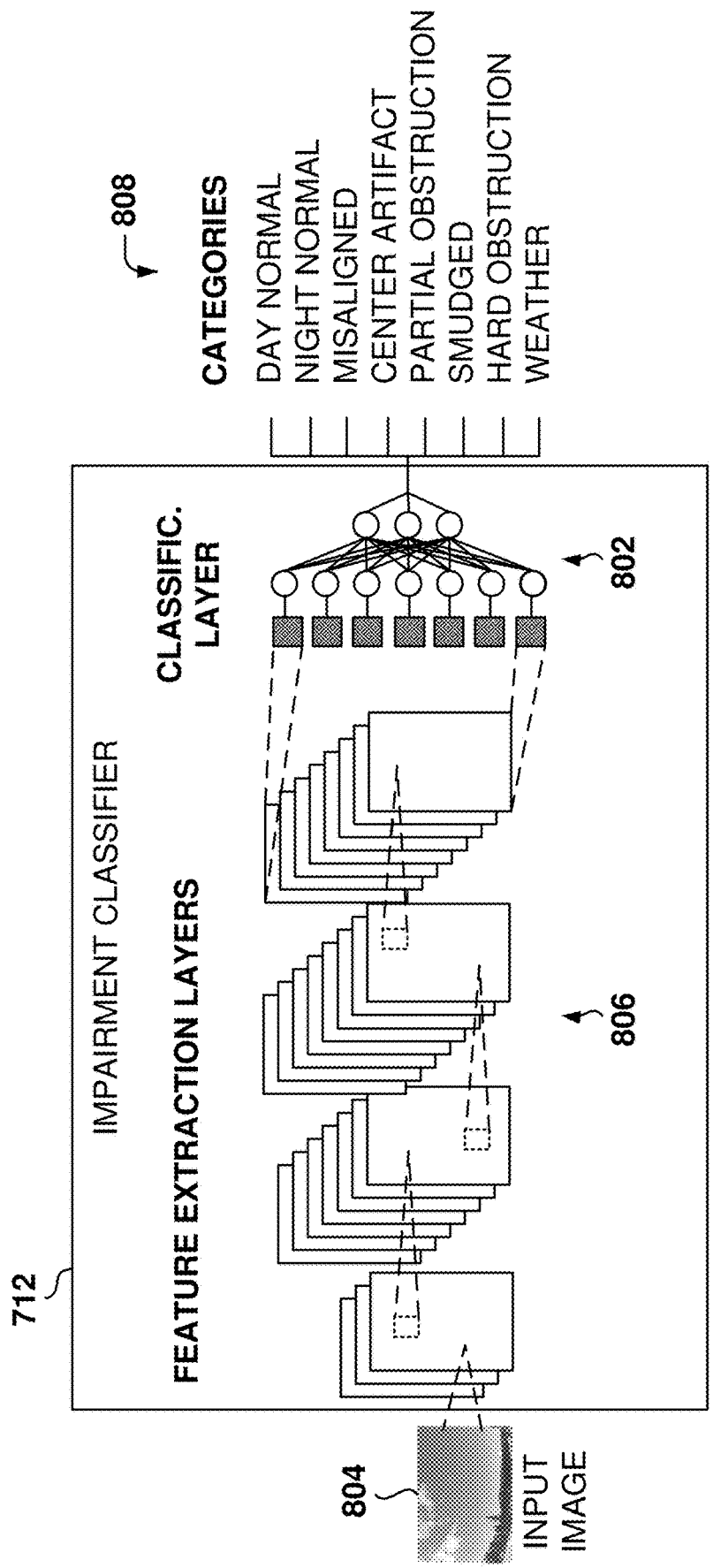
FIG. 8 illustrates the use of the impairment classifier to determine impairment conditions, according to some examples.

FIG. 8 illustrates the use of the impairment classifier 712 to determine impairment conditions, according to some examples. The impairment classifier 712 includes feature extraction layers 806 and a classification layer 802. During operation, the input image 804 is used as input to the impairment classifier 712. The feature extraction layers 806 create a feature vector for the input image 804 and pass it to the classification layer 802, which outputs the category 808 for the input image 804.

In the illustrated example, the categories 808 include day normal, night normal, misaligned, center artifact, partial obstruction, smudged, hard obstruction, and weather. In other examples, the more detailed list of categories 808 includes normal, hard obstruction (blocked) 25-50%, hard obstruction (blocked) 50-75%, hard obstruction (blocked) 75-100%, misalignment titled up, misalignment tilted down, misalignment upside down, misalignment rotated, misalignment reversed, smudges/blur, external vehicle artifacts, not attached to vehicle, normal with snow/fog, and normal inside building/tunnel/bridges/parking lot/walls.

During some experimentation and testing, the presented techniques were used to improve the operation of the cameras in vehicles, particularly for nighttime images. The techniques improved the identification of impaired cameras to generate events for administrators in all the categories.

Figure 9:
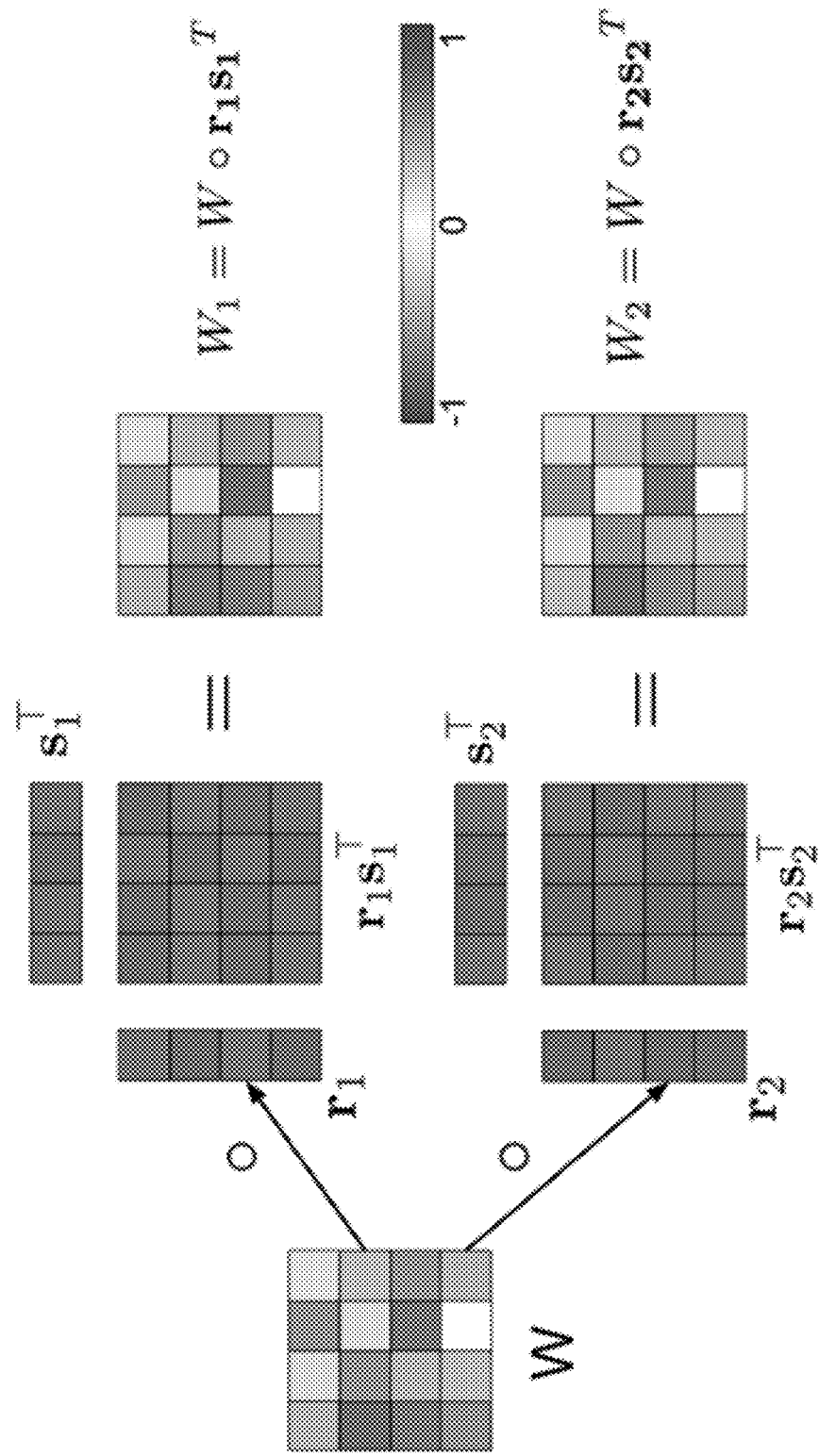
FIG. 9 illustrates the batch ensemble process for processing images, according to some examples.

FIG. 9 illustrates the batch ensemble process for processing images, according to some examples. The batch ensemble process improved accuracy and decreased the amount of computing resources to analyze camera images from all the vehicles every day.

In general, ensembles are methods where multiple neural networks are trained individually, and their predictions are averaged during inference. Ensembles have been shown to be successful in improving the accuracy and predictive uncertainty of single neural networks. However, an ensemble's cost for both training and testing increases linearly with the number of networks, which quickly becomes untenable.

Batch ensemble methods combine the predictions from multiple models to make a final prediction. By aggregating the predictions of multiple models, it is possible to reduce the variance and bias of the prediction, leading to improved performance and robustness. This approach can make the ensemble model more generalizable to unseen data compared to individual models.

Batch ensemble is an ensemble method whose computational and memory costs are significantly lower than typical ensembles. Batch ensemble achieves this by defining a weight matrix to be the Hadamard product of a shared weight among all ensemble members and a rank-one matrix per member. Unlike traditional ensembles, Batch ensemble is not only parallelizable across devices, where one device trains one member but also parallelizable within a device, where multiple ensemble members are updated simultaneously for a given mini-batch.

Batch ensemble introduces two rank-1 matrices R and S. Their dot product gives us this matrices Fs. We then take the Hadamard product of the original weight matrices and these new F matrices to generate an ensemble of models.

In some examples, five different impairment classifier models were used. During the inference phase, the predictions of the five models were combined to make the final prediction that is used to determine impairment. Initially, a single model was trained, and then two matrices were introduced to modify the model in five different ways in order to obtain five different models.

In one implementation, a ResNet 50 model was used, which is considered a heavy architecture. If five different ResNet 50 models were used, it would take five times the amount of computing resources to train and store these five models. However, by using matrices to modify one model, the result is a smaller amount of resources that would be required for five models.

By using batch ensemble on the impairment classifier, precision and recall for obstruction cases improved when compared to the non-ensemble approach. The improvements were particularly noticeable for nighttime scenarios where precision was about doubled.

Another improvement was achieved by combining the Batch ensemble with ONNX. ONNX stands for Open Neural Network Exchange and is an open format for representing deep learning models. ONNX is designed to allow interoperability between different deep learning frameworks, enabling models trained in one framework to be used in another without needing to recreate the model from scratch.

Using ONNX can potentially improve the performance of a ResNet model in several ways, including framework flexibility that allows the deployment across different deep learning frameworks, inference optimization by leveraging specific optimizations and hardware accelerators during inference (e.g., where the target deployment environment supports GPU acceleration), model quantization, and model fusion.

Regarding model quantization, ONNX supports quantization, which is the process of reducing the precision of the model's weights and activations. Quantization can significantly reduce model size and inference latency without sacrificing too much accuracy. Many frameworks provide tools for quantizing ONNX models, which can lead to improved performance, especially on resource-constrained devices. Further, ONNX supports the fusion of operations, which can reduce the number of individual operations in the model graph.

Figure 10:
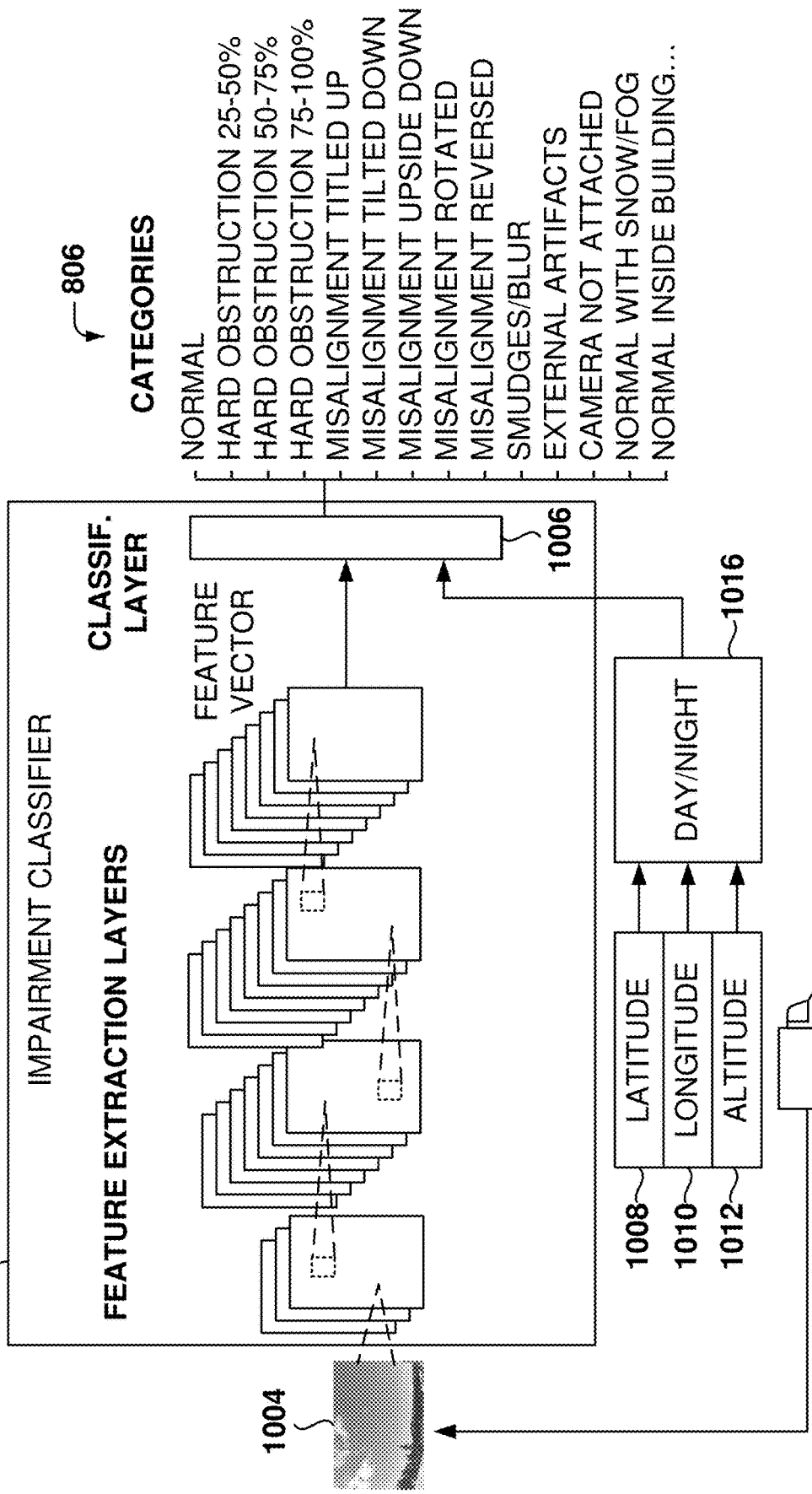
FIG. 10 illustrates the use of the impairment classifier, with day/night information, to determine impairment conditions, according to some examples.

FIG. 10 illustrates the use of the impairment classifier, with day/night information, to determine impairment conditions, according to some examples. Nighttime presents a bigger challenge than daytime for classification. In order to improve accuracy, information about the time the image was taken is provided to the classification layer 1006 of the impairment classifier 1002.

Based on GPS information from the vehicle, latitude 1008, longitude 1010, and altitude 1012 parameters were input for day/night utility 1016, which calculates if the input parameters were associated with the daytime or the nighttime. The day/night information is used as input for the classification layer 1006, which also takes as input the feature vector associated with the input image 1004, to generate the category 808. During training, the training images were assigned a label with the day/night information.

It was observed during experimentation that providing the day/night information improved the performance across several scenarios of camera impairment, including better precision and recall.

Figure 11:
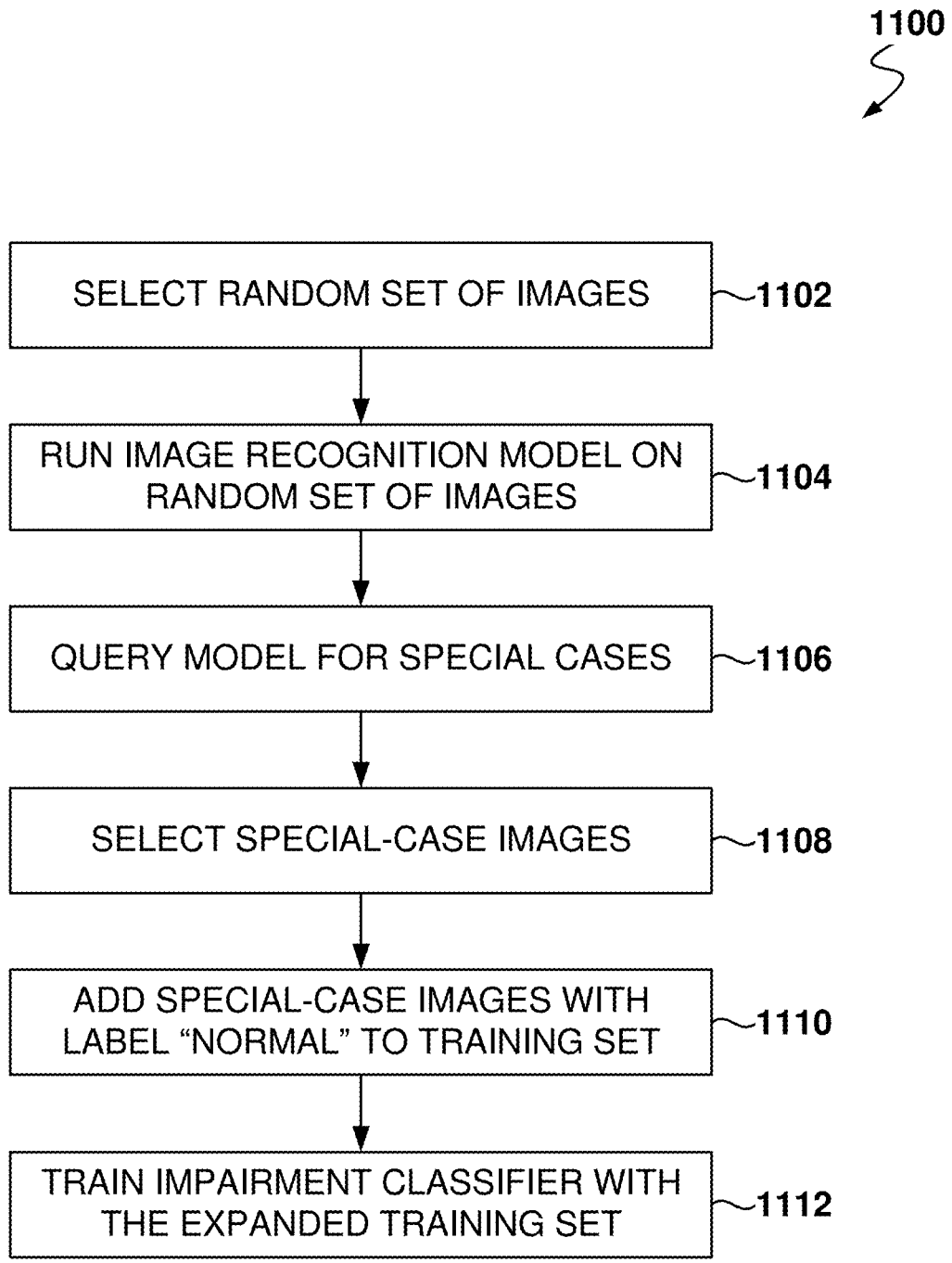
FIG. 11 is a flowchart of a method for detecting special scenarios and using the information to improve the training of the impairment classifier, according to some examples.

FIG. 11 is a flowchart of a method for detecting special scenarios and using the information to improve the training of the impairment classifier, according to some examples. While the various operations in this flowchart are presented and described sequentially, one of ordinary skill will appreciate that some or all of the operations may be executed in a different order, be combined or omitted, or be executed in parallel.

During testing, it was observed that there were cases where the camera feed was normal, but the model predicted that the camera was misaligned. These cases were limited to the vehicle being present in closed spaces such as buildings, parking garages, tunnels, and bridges. To correct this problem, a special-case model that performs image recognition was used periodically on a random set of images. Queries based on natural language prompts were submitted to identify a predetermined number of images that match the special-case criteria.

In some examples, the model was used to identify images for parking garages, tunnels, bridges, flyovers, and other similar scenarios. The identified images were then given assigned an automatic category of as "normal" and added to the training set of the impairment classifier.

At operation 1102, a random set of images is selected from a larger dataset. This operation ensures that the training set includes a diverse range of images, which may contain both typical and atypical examples.

From operation 1102, the method 1100 flows to operation 1104 to run an image recognition model on the random set of images.

From operation 1104, the method 1100 flows to operation 1106 for querying the model for the special cases (e.g., garage, tunnel).

From operation 1106, the method 1100 flows to operation 1108 for selecting the images that the recognition model identified as part of the special cases.

From operation 1108, the method 1100 flows to operation 1110, where the selected special-case images are added to the training set with the label "normal." This inclusion helps to create a more robust and comprehensive training set by introducing examples that may require the impairment classifier to adapt and learn from more complex or less frequent patterns.

From operation 1110, the method 1100 flows to operation 1112, where the impairment classifier is trained with the expanded training set. This training process involves adjusting the classifier's parameters to improve its accuracy and generalization capabilities, taking into account the newly added special-case images. As a result of the improved labeling, the performance of the impairment classifier improved.

FIG. 12 is a user interface (UI) 1202 for reviewing camera-impairment events, according to some examples. The UI 1202 is organized into a table format with several columns presenting different types of information for each event.

The first column, labeled image, displays a small image 1204 associated with the event detected. If the client selects (e.g., clicks) one of the images 1204, another UI will provide a larger scale of the image or a video associated with the image.

Adjacent to the image is the "Health Status" column, which indicates the event, such as the camera being misaligned or needing attention. The "Vehicle name" column provides identifiers for the vehicles associated with the cameras (e.g., 36-978), while the "Uptime last 50 hours" column shows a graphical representation of the device's operational time over the last 50 hours.

The "Last Location" column details the most recent known location of the device, with specific site names or coordinates. The next two columns, "Camera last connection" and "Last connection" present timestamps for the most recent connection from the camera and the last contact with the system overall.

Finally, the "Recommended action" column suggests the next operation to be taken based on the health status of the device, such as "Misaligned camera detected" or "Recording issues detected," to guide the user in maintaining optimal functionality of the cameras and vehicles.

The user interface is designed to provide a comprehensive at-a-glance overview of the status and performance of a fleet of vehicles, enabling quick identification of issues and facilitating prompt maintenance or corrective actions.

Figure 13:
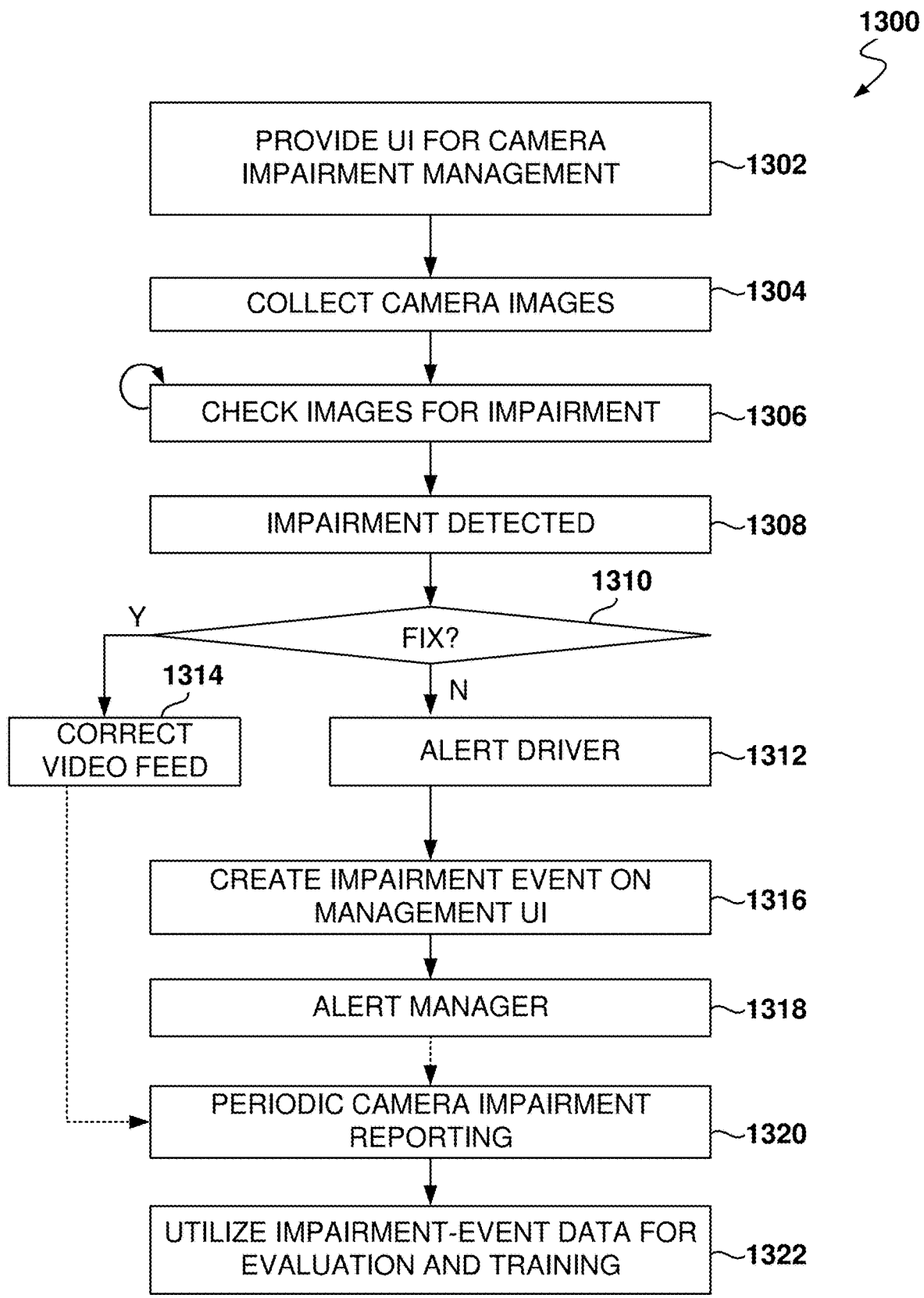
FIG. 13 is a flowchart of a method for managing camera impairment, according to some examples.

FIG. 13 is a flowchart of a method for managing camera impairment, according to some examples.

While the various operations in this flowchart are presented and described sequentially, one of ordinary skill will appreciate that some or all of the operations may be executed in a different order, be combined or omitted, or be executed in parallel.

At operation 1302, a user interface (UI) for camera impairment management is provided. Following this, at operation 1304, camera images are collected for analysis. In some examples, the images from the camera are collected at the beginning and the end of a trip. In other examples, additional images captured during the trip may also be collected.

At operation 1306, the collected images are checked periodically for any signs of impairment. If impairment is detected, as indicated at operation 1308, the method 1300 proceeds to a decision point at operation 1310, where it is determined whether the impairment can be fixed. From operation 1314, the method 1300 flows to operation 1320. If the impairment can be fixed, the method continues to operation 1314, where the video feed is corrected. If the impairment cannot be fixed, the method 1300 advances to operation 1312, where the driver is alerted to the camera impairment. For example, a verbal announcement may be output by the NGD at the beginning of a trip.

In some cases, the impairment of the camera may be fixed, so the BMS performs corrective action, and the problem is solved. For example, if the cameras are mislabeled as inward vs. outward, a command may be sent to the NGD in the vehicle to change the designation of the cameras. In another example, if the feed is upside down, the camera configuration can be changed to flip the images, or the images can be flipped when the images arrive at the BMS. For slight rotation cases (e.g., 20° or less), the image can be counterrotated by that amount at the NGD or at the BMS. This will help customers resolve issues without fidgeting with the physical camera, leading to much faster and more automated resolutions. In this case, an event may not be created since customer intervention is not required.

From operation 1312, method 1300 flows to operation 1316 where an impairment event is created on the management UI. This is followed by operation 1318, where a manager is alerted about the impairment. The method 1300 then moves to operation 1320, which involves periodic camera impairment reporting. At operation 1322, the impairment-event data is utilized for evaluation and training purposes.

Figure 14:
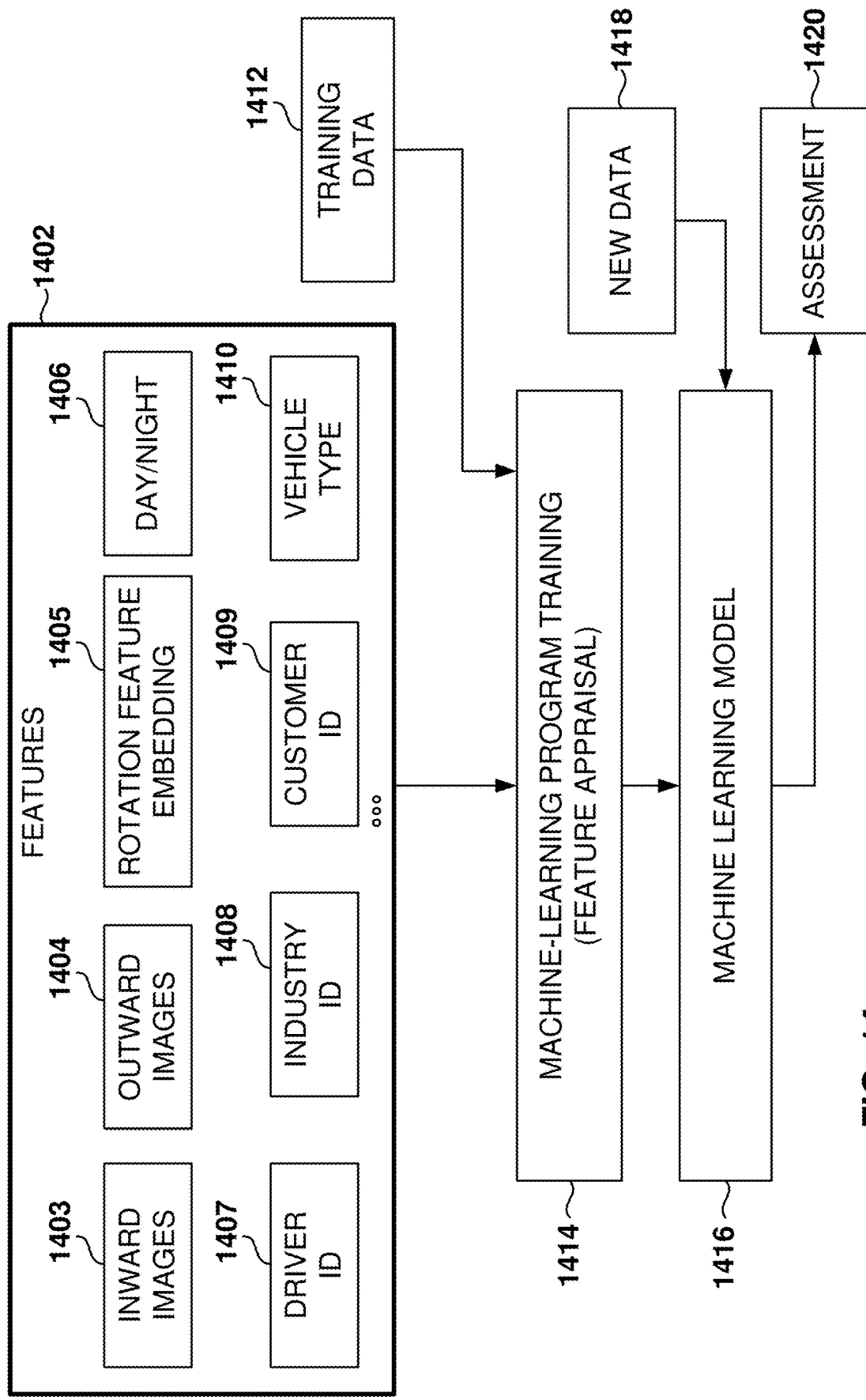
FIG. 14 illustrates the training and use of a machine-learning model, according to some example examples.

FIG. 14 illustrates the training and use of a machine-learning model 1416, according to some example examples. In some examples, machine learning (ML) models 1416 are utilized to perform operations associated with detecting a camera with an impaired view.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1416 from training data 1412 in order to make data-driven predictions or decisions expressed as outputs or assessments 1420. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 1416 outputs a value in the drowsiness scale index for a time window (e.g., last ten seconds).

The training data 1412 comprises examples of values for the features 1402. In some examples, the training data comprises labeled data with examples of values for the features 1402 and labels indicating the outcome, such as camera impairment detected. The machine-learning algorithms utilize the training data 1412 to find correlations among identified features 1402 that affect the outcome. A feature 1402 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In one example, the features 1402 may be of different types and may include one or more of inward images 1403 from inward videos, outward images 1404, rotation feature embedding 1405, indication 1406 if a timestamp corresponds to daytime or nighttime, driver identifier 1407 (ID), industry ID 1408, customer ID 1409, vehicle type 1410, etc. The industry ID provides valuable information, as different industries tend to have different requirements associated with types of vehicles, duration of trips, number of stops, etc. Some examples of types of industry include transportation & warehousing, wholesale trade, field services, passenger transit, construction, consumer products, retail trade, food & beverage, manufacturing, health care & social assistance, etc.

During training 1414, the ML program, also referred to as ML algorithm or ML tool, analyzes the training data 1412 based on identified features 1402 and configuration parameters defined for the training. The result of the training 1414 is the ML model 1416, which is capable of taking inputs to produce assessments.

Training an ML algorithm involves analyzing large amounts of data (e.g., from several gigabytes to a terabyte or more) in order to find data correlations. The ML algorithms utilize the training data 1412 to find correlations among the identified features 1402 that affect the outcome or assessment 1420. In some examples, the training data 1412 includes labeled data, which is known data for one or more identified features 1402 and one or more outcomes, such as the type of camera impairment.

The ML algorithms usually explore many possible functions and parameters before finding what the ML algorithms identify to be the best correlations within the data; therefore, training may make use of large amounts of computing resources and time.

When the ML model 1416 is used to perform an assessment, new data 1418 is provided as input to the ML model 1416, and the ML model 1416 generates the assessment 1420 as output. For example, when analyzing an outward image, the ML model 1416 calculates a categorical value for possible types of impairment or if there is no impairment (e.g., categorical value of "normal").

In some examples, results obtained by the model 1416 during operation (e.g., assessment 1420 produced by the model in response to inputs) are used to improve the training data 1412, which is then used to generate a newer version of the model. Thus, a feedback loop is formed to use the results obtained by the model to improve the model. In some examples, the ML program is one of ResNet model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

Figure 15:
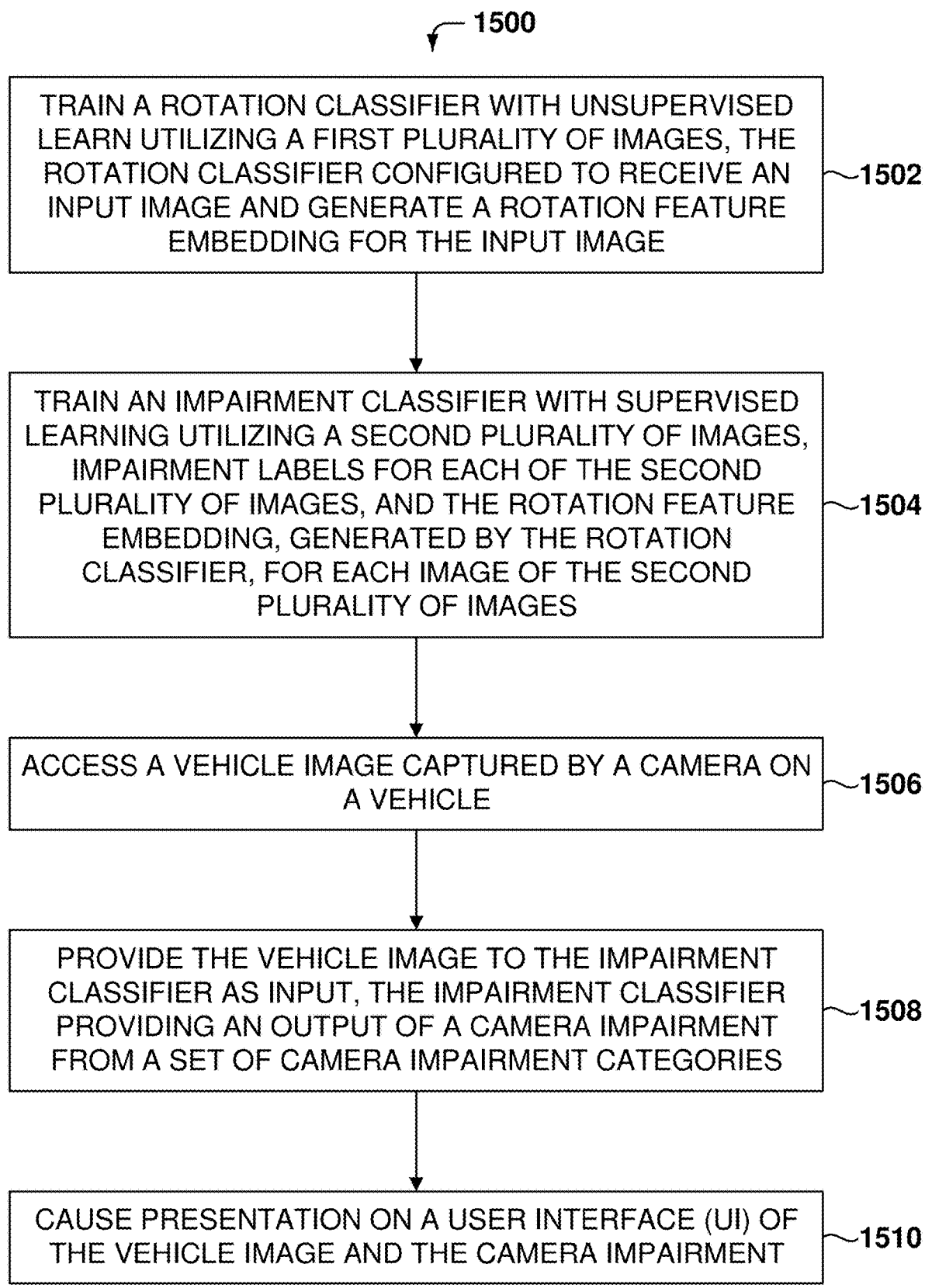
FIG. 15 is a flowchart of a method for detecting impaired views in cameras used for monitoring the environment, according to some examples.

FIG. 15 is a flowchart of a computer-implemented method 1500 for detecting impaired views in cameras used for monitoring the environment, according to some examples.

While the various operations in this flowchart are presented and described sequentially, one of ordinary skill will appreciate that some or all of the operations may be executed in a different order, be combined or omitted, or be executed in parallel.

Operation 1502 is for training a rotation classifier with unsupervised learning utilizing a first plurality of images. The rotation classifier is configured to receive an input image and generate a rotation feature embedding for the input image.

From operation 1502, the method 1500 flows to operation 1504 for training an impairment classifier with supervised learning utilizing a second plurality of images, impairment labels for each of the second plurality of images, and the rotation feature embedding, generated by the rotation classifier, for each image of the second plurality of images.

From operation 1504, the method 1500 flows to operation 1506 for accessing a vehicle image captured by a camera on a vehicle.

From operation 1506, the method 1500 flows to operation 1508 for providing the vehicle image to the impairment classifier as input, the impairment classifier providing an output of a camera impairment from a set of camera impairment categories.

From operation 1508, the method 1500 flows to operation 1510 for causing presentation on a user interface (UI) of the vehicle image and the camera impairment.

In some examples, the method 1500 further comprises determining, at a behavioral monitoring system (BMS), that the camera impairment is fixable based on a rotation of the vehicle image; and rotating, at the BMS, images received from the vehicle for behavioral monitoring of the vehicle.

In some examples, the method 1500 further comprises determining, at a behavioral monitoring system (BMS), that the camera impairment is fixable based on a rotation of the vehicle image; and sending, from the BMS to a network gateway device (NGD) at the vehicle, a request to rotate the images captured by the camera in the vehicle.

In some examples, the camera impairment corresponds to a camera that is unable to provide clear and accurate images required for vehicle behavioral monitoring.

In some examples, the training of the impairment classifier further includes information about daytime or nighttime associated with each image from the second plurality of images, where the impairment classifier further receives as input the information about daytime or nighttime associated with the vehicle image.

In some examples, the method 1500 further comprises monitoring a fleet of vehicles to determine camera impairment for cameras installed in the fleet of vehicles, and the monitoring comprises checking for camera impairment based on images captured at the beginning or end of trips of the vehicles in the fleet of vehicles.

In some examples, the camera impairment categories comprise two or more of normal; hard obstruction 25-50%; hard obstruction 50-75%; hard obstruction 75-100%; misalignment titled up; misalignment tilted down; misalignment upside down; misalignment rotated; misalignment reversed; smudges; external vehicle artifacts; not attached to vehicle; normal with snow or fog; and normal inside building, tunnel, bridges, parking lot, or walls.

In some examples, the camera impairment categories comprise two or more of day normal, night normal, misaligned, center artifact, partial obstruction, smudged, hard obstruction, and weather.

In some examples, the method 1500 further comprises causing an alert for the driver of the vehicle in response to the camera impairment.

In some examples, the method 1500 further comprises generating a report of camera impairment events for a fleet of vehicles; and causing presentation in the UI of the report.

Given the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: training a rotation classifier with unsupervised learning utilizing a first plurality of images, the rotation classifier configured to receive an input image and generate a rotation feature embedding for the input image; training an impairment classifier with supervised learning utilizing a second plurality of images, impairment labels for each of the second plurality of images, and the rotation feature embedding, generated by the rotation classifier, for each of the second plurality of images; accessing a vehicle image captured by a camera on a vehicle; providing the vehicle image to the impairment classifier as input, the impairment classifier providing an output of a camera impairment from a set of camera impairment categories; and causing presentation on a user interface (UI) of the vehicle image and the camera impairment.

In yet another general aspect, a tangible machine-readable storage medium (e.g., a non-transitory storage medium) includes instructions that, when executed by a machine, cause the machine to perform operations comprising: training a rotation classifier with unsupervised learning utilizing a first plurality of images, the rotation classifier configured to receive an input image and generate a rotation feature embedding for the input image; training an impairment classifier with supervised learning utilizing a second plurality of images, impairment labels for each of the second plurality of images, and the rotation feature embedding, generated by the rotation classifier, for each of the second plurality of images; accessing a vehicle image captured by a camera on a vehicle; providing the vehicle image to the impairment classifier as input, the impairment classifier providing an output of a camera impairment from a set of camera impairment categories; and causing presentation on a user interface (UI) of the vehicle image and the camera impairment.

Figure 16:
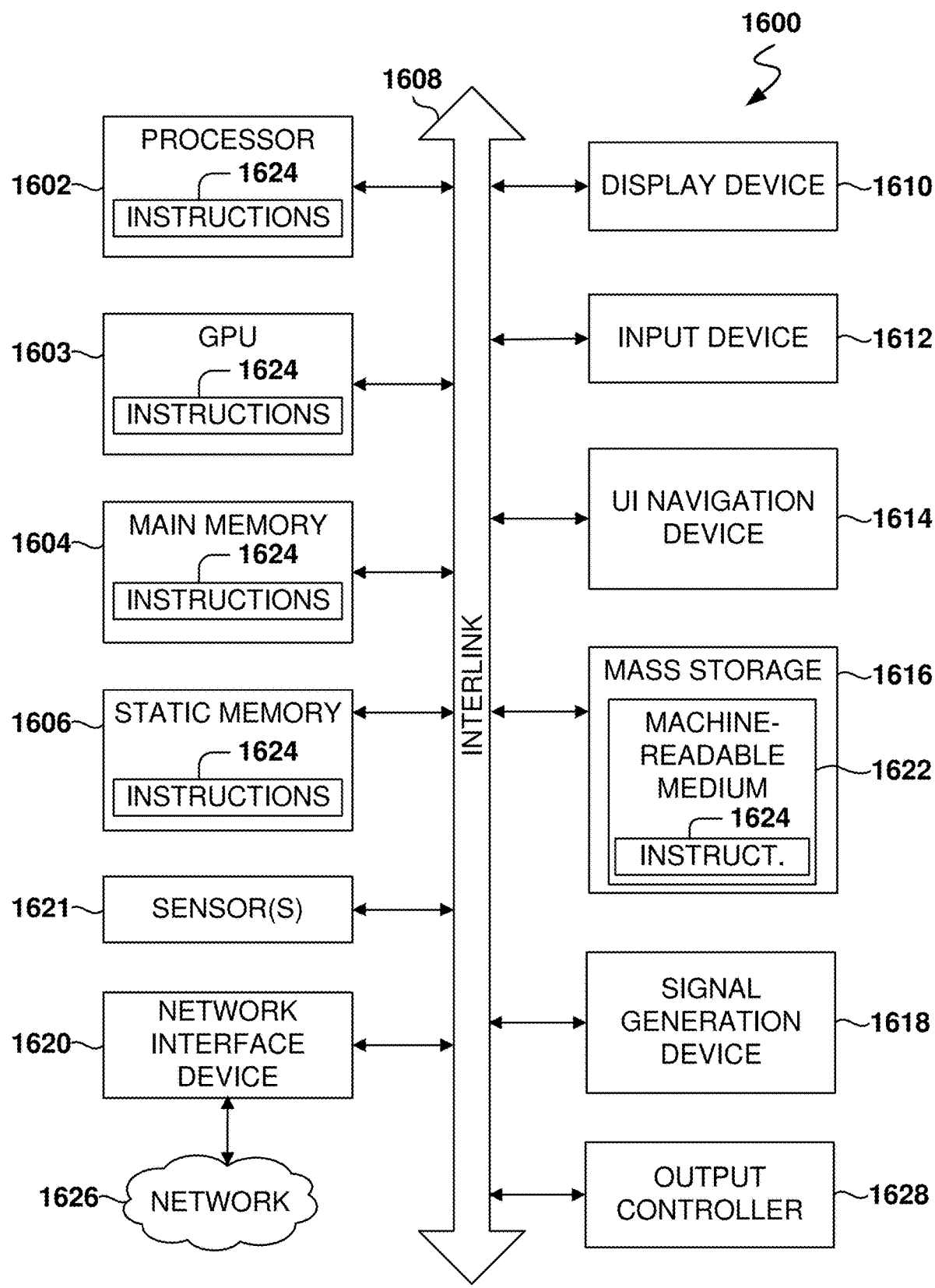
FIG. 16 is a block diagram illustrating an example of a machine upon or by which one or more example process examples described herein may be implemented or controlled.

FIG. 16 is a block diagram illustrating an example of a machine 1600 upon or by which one or more example process examples described herein may be implemented or controlled. In alternative examples, the machine 1600 may operate as a standalone device or be connected (e.g., networked) to other machines. In a networked deployment, the machine 1600 may operate in the capacity of a server machine, a client machine, or both in server-client network environments. In an example, the machine 1600 may act as a peer machine in a peer-to-peer (P2P) (or other distributed) network environment. Further, while only a single machine 1600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1600 (e.g., computer system) may include a hardware processor 1602 (e.g., a central processing unit (CPU), a hardware processor core, or any combination thereof), a graphics processing unit (GPU 1603), a main memory 1604, and a static memory 1606, some or all of which may communicate with each other via an interlink 1608 (e.g., bus). The machine 1600 may further include a display device 1610, an alphanumeric input device 1612 (e.g., a keyboard), and a user interface (UI) navigation device 1614 (e.g., a mouse). In an example, the display device 1610, alphanumeric input device 1612, and UI navigation device 1614 may be a touch screen display. The machine 1600 may additionally include a mass storage device 1616 (e.g., drive unit), a signal generation device 1618 (e.g., a speaker), a network interface device 1620, and one or more sensors 1621, such as a Global Positioning System (GPS) sensor, compass, accelerometer, or another sensor. The machine 1600 may include an output controller 1628, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1602 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1602 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1602 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1602 may be emulated in software, running on a physical processor, as a virtual processor or virtual circuit. The virtual processor may behave like an independent processor but is implemented in software rather than hardware.

The mass storage device 1616 may include a machine-readable medium 1622 on which one or more sets of data structures or instructions 1624 (e.g., software) embodying or utilized by any of the techniques or functions described herein. The instructions 1624 may also reside, completely or at least partially, within the main memory 1604, within the static memory 1606, within the hardware processor 1602, or the GPU 1603 during execution thereof by the machine 1600. For example, one or any combination of the hardware processor 1602, the GPU 1603, the main memory 1604, the static memory 1606, or the mass storage device 1616 may constitute machine-readable media.

While the machine-readable medium 1622 is illustrated as a single medium, the term "machine-readable medium" may include a single medium or multiple media (e.g., a centralized or distributed database and associated caches and servers) configured to store one or more instructions 1624.

The term "machine-readable medium" may include any medium that is capable of storing, encoding, or carrying instructions 1624 for execution by the machine 1600 and that causes the machine 1600 to perform any one or more of the techniques of the present disclosure or that is capable of storing, encoding, or carrying data structures used by or associated with such instructions 1624. Non-limiting machine-readable medium examples may include solid-state memories and optical and magnetic media. For example, a massed machine-readable medium comprises a machine-readable medium 1622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may be transmitted or received over a communications network 1626 using a transmission medium via the network interface device 1620.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   training a rotation classifier with unsupervised learning utilizing a first plurality of images, the rotation classifier configured to receive an input image and generate a rotation feature embedding for the input image;
   training an impairment classifier with supervised learning utilizing a second plurality of images, impairment labels for each image of the second plurality of images, and the rotation feature embedding, generated by the rotation classifier, for each of the second plurality of images;
   accessing a vehicle image captured by a camera on a vehicle;
   providing the vehicle image to the impairment classifier as input, the impairment classifier providing an output of a camera impairment from a set of camera impairment categories; and
   causing presentation on a user interface (UI) of the vehicle image and the camera impairment.

2. The method as recited in claim 1, further comprising:
   determining, at a behavioral monitoring system (BMS), that the camera impairment is fixable based on a rotation of the vehicle image; and
   rotating, at the BMS, images received from the vehicle for behavioral monitoring of the vehicle.

3. The method as recited in claim 1, further comprising:
   determining, at a behavioral monitoring system (BMS), that the camera impairment is fixable based on a rotation of the vehicle image; and
   sending, from the BMS to a network gateway device (NGD) at the vehicle, a request to rotate the images captured by the camera in the vehicle.

4. The method as recited in claim 1, wherein the camera impairment corresponds to a camera that is unable to provide clear and accurate images required for vehicle behavioral monitoring.

5. The method as recited in claim 1, wherein the training of the impairment classifier further includes information about daytime or nighttime associated with each image from the second plurality of images, wherein the impairment classifier further receives as input the information about daytime or nighttime associated with the vehicle image.

6. The method as recited in claim 1, further comprising:
   monitoring a fleet of vehicles to determine camera impairment for cameras installed in the fleet of vehicles, the monitoring comprising checking for camera impairment based on images captured at a beginning or an end of trips of the vehicles in the fleet of vehicles.

7. The method as recited in claim 1, wherein the camera impairment categories comprise two or more of normal; hard obstruction 25-50%; hard obstruction 50-75%; hard obstruction 75-100%; misalignment titled up; misalignment tilted down; misalignment upside down; misalignment rotated; misalignment reversed; smudges; external vehicle artifacts; not attached to vehicle; normal with snow or fog; and normal inside building, tunnel, bridges, parking lot, or walls.

8. The method as recited in claim 1, wherein the camera impairment categories comprise two or more of day normal, night normal, misaligned, center artifact, partial obstruction, smudged, hard obstruction, and weather.

9. The method as recited in claim 1, further comprising: causing an alert for a driver of the vehicle in response to the camera impairment.

10. The method as recited in claim 1, further comprising: generating a report of camera impairment events for a fleet of vehicles; and
causing presentation in the UI of the report.

11. A system comprising:
a memory comprising instructions; and
one or more computer processors, wherein the instructions, when executed by the one or more computer processors, cause the system to perform operations comprising:
training a rotation classifier with unsupervised learning utilizing a first plurality of images, the rotation classifier configured to receive an input image and generate a rotation feature embedding for the input image;
training an impairment classifier with supervised learning utilizing a second plurality of images, impairment labels for each image of the second plurality of images, and the rotation feature embedding, generated by the rotation classifier, for each of the second plurality of images;
accessing a vehicle image captured by a camera on a vehicle;
providing the vehicle image to the impairment classifier as input, the impairment classifier providing an output of a camera impairment from a set of camera impairment categories; and
causing presentation on a user interface (UI) of the vehicle image and the camera impairment.

12. The system as recited in claim 11, wherein the instructions further cause the one or more computer processors to perform operations comprising:
determining, at a behavioral monitoring system (BMS), that the camera impairment is fixable based on a rotation of the vehicle image; and
rotating, at the BMS, images received from the vehicle for behavioral monitoring of the vehicle.

13. The system as recited in claim 11, wherein the instructions further cause the one or more computer processors to perform operations comprising:
determining, at a behavioral monitoring system (BMS), that the camera impairment is fixable based on a rotation of the vehicle image; and
sending, from the BMS to a network gateway device (NGD) at the vehicle, a request to rotate the images captured by the camera in the vehicle.

14. The system as recited in claim 11, wherein the camera impairment corresponds to a camera that is unable to provide clear and accurate images required for vehicle behavioral monitoring.

15. The system as recited in claim 11, wherein the training of the impairment classifier further includes information about daytime or nighttime associated with each image from the second plurality of images, wherein the impairment classifier further receives as input the information about daytime or nighttime associated with the vehicle image.

16. A non-transitory machine-readable storage medium including instructions that, when executed by a machine, cause the machine to perform operations comprising:
training a rotation classifier with unsupervised learning utilizing a first plurality of images, the rotation classifier configured to receive an input image and generate a rotation feature embedding for the input image;
training an impairment classifier with supervised learning utilizing a second plurality of images, impairment labels for each image of the second plurality of images, and the rotation feature embedding, generated by the rotation classifier, for each of the second plurality of images;
accessing a vehicle image captured by a camera on a vehicle;
providing the vehicle image to the impairment classifier as input, the impairment classifier providing an output of a camera impairment from a set of camera impairment categories; and
causing presentation on a user interface (UI) of the vehicle image and the camera impairment.

17. The non-transitory machine-readable storage medium as recited in claim 16, wherein the machine further performs operations comprising:
determining, at a behavioral monitoring system (BMS), that the camera impairment is fixable based on a rotation of the vehicle image; and
rotating, at the BMS, images received from the vehicle for behavioral monitoring of the vehicle.

18. The non-transitory machine-readable storage medium as recited in claim 16, wherein the machine further performs operations comprising:
determining, at a behavioral monitoring system (BMS), that the camera impairment is fixable based on a rotation of the vehicle image; and
sending, from the BMS to a network gateway device (NGD) at the vehicle, a request to rotate the images captured by the camera in the vehicle.

19. The non-transitory machine-readable storage medium as recited in claim 16, wherein the camera impairment corresponds to a camera that is unable to provide clear and accurate images required for vehicle behavioral monitoring.

20. The non-transitory machine-readable storage medium as recited in claim 16, wherein the training of the impairment classifier further includes information about daytime or nighttime associated with each image from the second plurality of images, wherein the impairment classifier further receives as input the information about daytime or nighttime associated with the vehicle image.

* * * * *